United States Patent
Verlinden et al.

[11] 4,008,036
[45] Feb. 15, 1977

[54] DIE ASSEMBLY

[75] Inventors: Victor Clement Verlinden, Edegem; Victor Franciscus De Beul, Mortsel, both of Belgium

[73] Assignee: AGFA-GEVAERT N.V., Mortsel, Belgium

[22] Filed: May 29, 1975

[21] Appl. No.: 581,917

[30] Foreign Application Priority Data

June 17, 1974 United Kingdom ............ 26806/74

[52] U.S. Cl. .............................. 425/466; 425/381
[51] Int. Cl.² .......................................... B29F 3/04
[58] Field of Search .......... 425/381, 380, 465, 466, 425/188, 192; 264/176 R

[56] References Cited
UNITED STATES PATENTS

| 3,067,464 | 12/1962 | Nicholson | 425/466 |
| 3,320,634 | 5/1967 | Ryan et al. | 425/466 X |
| 3,797,987 | 3/1974 | Marion | 425/466 X |
| 3,884,611 | 5/1975 | Anderson et al. | 425/466 X |
| 3,902,835 | 9/1975 | Theysohn | 425/188 |

Primary Examiner—Richard B. Lazarus
Assistant Examiner—Mark Rosenbaum
Attorney, Agent, or Firm—William J. Daniel

[57] ABSTRACT

A die assembly with two spaced lips which define an elongated die orifice, wherein one of the lips is adjustable by means of wedges which are in sliding engagement with an inclined face of the lip and which are disposed in spaced relation along the length of the orifice and wherein for each wedge a spring is provided that keeps the wedges in firm contact with the corresponding faces, thereby to obtain a localized adjustment of the lip and a firm locking of the local lip position.

12 Claims, 4 Drawing Figures

DIE ASSEMBLY

The present invention relates to a die assembly with two spaced lips defining an elongated die orifice, and means for adjusting a lip along the length thereof to regulate the opening between the lips.

A first type of die assembly with an elongate adjustable lip comprises an undeformable body section with two separate lips, one lip being fixedly and the other one being slideably fitted to the body section, as disclosed for instance in U.S. Pat. No. 3,264,686 of Fred Soloduk issued Aug. 9, 1966. The position of the slideable lip is controlled by adjustment screws which extend about normal to the symmetry plane of the die orifice, and the mounting of the lip and the locking of its position occur by bolts which may clamp the lip to the front side of the body section. An advantage of this type of die assembly is that the parallelism or the angle as the case may be, between the opposed innerside surfaces of the lips which determine the die orifice is not altered upon adjustment. An important disadvantage of such type of die assembly is the discontinuity which is caused in the distribution channel of the die by the edge of the displaceable lip which may disturb and cause stagnation of the liquid flow in the die orifice.

A second type of die assembly with an elongate adjustable lip comprises a die body which is divided by a region of reduced cross-section into a larger and a smaller section, as disclosed for instance in British patent specification No. 1,177,652 filed Mar. 14, 1966 by Agfa-Gevaert N.V. The larger section functions as an undeformable base while the smaller section functions as a lever at the extremity of which there is a lip, the smaller section being displaceable by adjustment screws which are spaced lengthwise of the die and the axes of which run about parallel with the extrusion plane of the die. The adjustment involves a local deformation of the said die body, at its weakened region of reduced cross section. Each adjustment screw locally alters the position of the lip at the extremity of the smaller section with respect to the opposite, undeformable lip. The rigidity of the smaller section of the die body in a direction which is normal to the plane of extrusion must be sufficient to resist the forces in the die assembly which are created by the liquid composition pumped into the die, and which tend to give the die orifice an oval or elliptical cross section.

This second type of die assembly suffers from the following disadvantages.

The stresses to which the region of reduced cross section may be subjected upon unskilled adjustment can easily exceed the elastic limit of the die body material so that said region may become permanently deformed.

The adjustment necessitates the exertion of quite large forces by the adjustment screws, as a consequence of the said inherent rigidity of such die body.

The effect of the adjustment of any one adjustment screw is not limited to a region of the lip in the immediate vicinity of said screw, but extends at least to lip regions between the pair of adjustment screws on each side of the screw which is being adjusted. This particular behaviour is due to the rigidity of the adjustable lip and the insufficient locking of the lip. The locking of the lip, or in other words the immobility of the inner lip face which forms one boundary of the die orifice, depends on the following conditions. First, the invariability of the distance between said adjustable lip and the opposite lip at locations along the die orifice which correspond with the axes of the adjustment screws and, second, the absence of any tilting or bending of the inner face of the adjustable lip at such locations. Whereas in practice the first condition raises no particular problems since the normal stress differences in the adjustable lip upon adjustment of a given adjustment screw hardly alter the lip setting at the locations of the adjacent screws, the second condition is apparently not satisfied in known adjustable die assemblies. It is believed that, as a given screw is being adjusted, portions of the adjustable lip which are situated on opposite sides of said adjusted screw carry out a tilting or a bending motion about the lip zones where the adjacent adjustment screws are located so that a kind a wave-like deformation pattern of the inner lip face is produced which may extend over a distance covering two or more adjustment screws at each side of the screw which is being adjusted.

Still another type of die assembly comprises an elongate lip which is adjustable by means of a number of displaceable wedges, as disclosed in published Dutch Pat. application No. 6805041 of Algemene Kunstzijde-Unie issued Apr. 25, 1969. This type of die assembly is liable to the same drawback as the die assembly discussed hereinbefore, namely the effect of the adjustment of any one adjustment screw is not limited to a region of the lip in the immediate vicinity of said screw. The cause for the insufficient locking of the position of the lip appears in this last case to be due to the uncontrolled pressure of the lip on the adjusting wedges and on the limited portion of the lip face which is in contact with the adjusting wedges, said portion being, moreover, situated at the end of the lip which is remote from the orifice so that the lip may pivot on the adjusting wedges.

The present invention aims at providing an adjustable die assembly which is generally free from the disadvantages of the aforesaid types of die assemblies but combines the good features of all of them.

According to the present invention, there is provided a die assembly comprising a die body section with a pair of lip members which have lips defining a slot-like orifice through which material can be extruded as a layer, at least one such lip member having a neck portion which is deformable to allow movements of adjustment of such lip thereby to vary the width of said orifice, a plurality of wedge-like adjusting members disposed in spaced relation along the projected length of said orifice, between relatively inclined faces of the body section and of the lip respectively, and means for individually adjusting the position of such wedge-like adjusting members, wherein the depth of the relatively inclined face of the adjustable lip is not substantially smaller than the depth of the face of the lip which determines one boundary of the die orifice, and wherein there are provided biasing means for each adjusting member for keeping the portions of the relatively inclined faces of the body section and of the lip which are in engagement with the corresponding faces of the adjusting members in firm contact with said corresponding faces, thereby to cause translational movements of adjustment of such lip by wedge action.

The term "depth" as used in the present statement of invention denotes that dimension of the concerned face which is normal to the length of the die assembly. Preferred but optional features of the invention are as follows.

The adjusting members are equally spaced along the projected length of the slot-like orifice.

The distance over which the adjusting members are in contact with the contacting face of the lip equals at least 50 % of the length of the lip face.

The adjustable lip member is replaceably fitted to the body section.

A plurality of pull-bolts are spaced lengthwise of the die assembly and pass through bores in the body section of the die assembly, and they are screwed into the adjustable lip member for exerting a tension force on such member.

The pulling force is established by compression springs which are provided between heads of the bolts and corresponding shoulders of the bores.

The pull-bolts pass through bores in said adjusting members. The cross-section of these bores is such as to permit a displacement of the wedges over the desired adjustment range and to ensure the proper guidance of such wedges in co-operation with the pull-bolts passing through said bores.

A die assembly according to the present invention may be used for the application of liquid compositions onto a moving support according to the so-called extrusion coating process which involves the stretching of the layer of coating composition between the die orifice and the contact zone with the support. The description hereinafter will particularly refer to die assemblies for use in extrusion coating.

It should be understood, however, that a die assembly according to the invention may also be used in installations for the coating of layers on a support according to the so-called cascade or curtain coating techniques wherein the initial formation of a layer of a liquid coating composition occurs likewise by flowing the coating composition from a supply thereof through an elongate opening which is formed by two lips, or by two members capable of determining opposite inner lip surfaces.

Finally, a die assembly according to the invention is also suitable for forming films or self-supporting layers. An example of films is the extrusion of a molten thermoplastic, for instance the extrusion of polyethylene terephthalate in the production of film base for photographic material or ferromagnetic recording material.

An example of a self-supporting layer is the extrusion of a magnetizable layer onto a polished temporary support such as an endless belt. The layer is stripped from the support after solidification and adhered to a permanent support so that a magnetic recording tape may be obtained with an extremely smooth recording surface.

The invention will hereinafter be described by way of example with reference to the accompanying drawings wherein.

Figure 1:
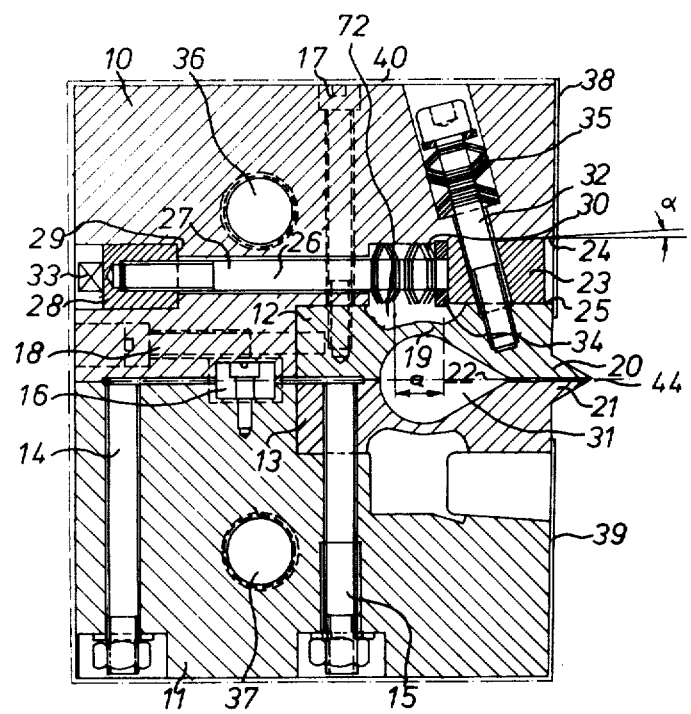
FIG. 1 is a vertical sectional view of one embodiment of a die assembly for extrusion coating, such sectional view being taken on line 1—1 of FIG. 2.

Referring to FIG. 1, the die assembly illustrated consists essentially of four members, namely a body section comprising the body members 10 and 11, and two lip members 12 and 13, the body members being of massive construction to impart substantial rigidity.

Two rows of threaded studs 14 and 15 which are spaced lengthwise of the die assembly, extend through the body members and hold them securely together. The exact mutual relationship of the body members is secured by a bar 16 which is fixedly attached to the body member 11 and which fits in a corresponding groove of the body member 10 upon assembling. The lip members 12 and 13 are replaceably attached to the corresponding body members by means of two series of lengthwise spaced bolts 17 and 18, as illustrated for the body member 10. The axes of the bolts of both series are staggered with respect to each other. The lip member 12 has a region 19 of reduced cross-section which is sufficiently long, as indicated by the dimension $a$, to permit a translational motion of the lip 20 in a direction which is normal to the extrusion plane 22, over the required adjustment range without exceeding the elastic limit of the lip material at said region of reduced cross-section.

The adjustment of the local position of the adjustable lip 20 occurs by means of a plurality of wedge-like members 23 which are situated at positions spaced lengthwise of the die, and which fit between accurately planed lower elongated surfaces 24 of the body member 10 and the corresponding elongated upper surface 25 of the lip 20.

The position of the wedge-like members 23 in the direction of the axis 26 is controlled by adjustment screws in the form of studs 27 which pass freely through corresponding bores in the body member 10. The studs are fixedly attached to the wedges and they are threadedly engaged at their free extremities, by a skirt or nut member 28 which bears against a shoulder 29 formed in the body member 10. A head piece 33 permits the nut member to be engaged and rotated by an appropriate tool.

A plurality of compression springs in the form of disc springs 30 is fitted over each stud 26 between the wedge-like members 23 and a corresponding shoulder portion of the body member 10. The biasing force of the springs 30 is such that under any circumstances of lip pressure as a consequence of adjustments of the adjusting members, of pressure exerted by the coating composition on the lip member 12 and of the stress exerted by the pull-bolts 32 which will be described hereinafter, said springs are capable of displacing the adjusting wedges towards the front side of the die assembly upon rotation of the threaded nut members 28 in a direction to disengage them from the studs 27. A spacer ring 34 determines, in addition to the number and type of disc springs, the biasing force for the wedge-like members 23 at a given position of said members.

A plurality of pull-bolts 32 are located at positions spaced lengthwise of the die assembly. They pass freely through corresponding bores in the body member 10 and through bores 71 in the wedge-like members 23, and they are screwed into threaded bores in the upper part of the lip 20. Compression springs, for instance in the form of disc springs 35, are provided between the heads of the bolts 32 and corresponding shoulders in the body member 10 and cause the bolts 32 to function as pull-bolts which firmly urge the elongated upper surface of the lip 20 in contact with the corresponding lower surfaces of the adjusting members 23, and in that way also firmly urge the upper surfaces of said adjusting members in contact with the elongated lower surface 24 of the body member. The tensioning forces of the several pull-bolts 32 are about equal to each other and they are determined by the type of disc springs, and the depth over which the bolts 32 are screwed into the lip 20.

It should be noted that the bores 71 in the wedge-like adjusting members 23 have a cross-section which is elongated rather than circular. The longer dimension of the bores is in the direction of the axis 26 so that the members may be displaced through the required adjustment range by the studs 27, whereas the smaller dimension of the bores, ensures the proper guidance of the member in cooperation with the bolts 32 in a direction which runs parallel with the length of the die.

The open space 72 which remains between the body member 10 and the lip member 12 after the installation of the wedge-like adjustment members and the positioning of the several screws and springs, may be filled with a liquid which polymerizes in place thereby to build a resilient filling, e.g. of silicone rubber which forms a seal against dust and moisture and which also prevents undesirable circulation of air.

The construction of the lower lip member 13 and the adjustment of the lip 21 thereof correspond exactly with the construction and the adjustment of the upper counterpart, and in practice both lip members may be perfectly interchangeable and they may also be directly interchangeable with a spare lip member. It will be noted that the inner surface of lip 20 runs parallel with the opposed inner surface of lip 21 in the direction of extrusion.

The direction of extrusion is also the direction according to which, in the present case of faces parallel with the extrusion plane, the depth of those faces as defined in the introduction of the specification should be measured.

The die body illustrated in FIG. 1 finally comprises bores 36 and 37 for the passage of a heating liquid, and shields 38 and 39 for closing the openings at the front side of the die assembly at the location of the wedge-like adjusting members. Where necessary, the die assembly may be heated by a heater band 40, as shown in broken lines on top of the die assembly.

Figure 2:
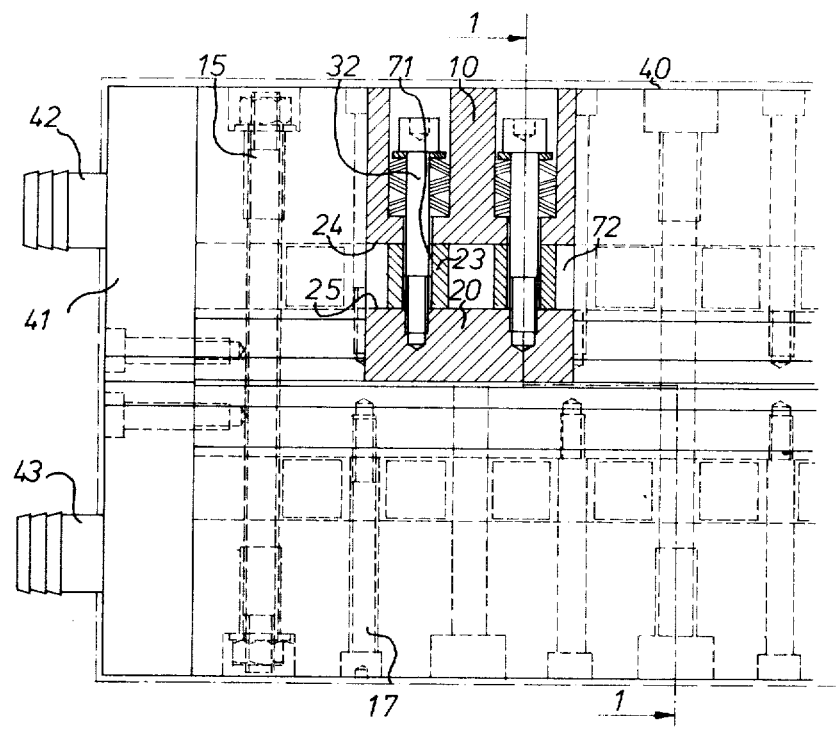
FIG. 2 is an elevational view of the die assembly according to FIG. 1.

Referring to FIG. 2, it may be seen that the die assembly is closed at one lateral side by an end plate 41 which is provided with hollow studs 42 and 43 for connection of the inner channels 36 and 37 to a suitable liquid circuit. The opposite lateral end plate of the die assembly is not illustrated in the figure, but in a known way it may be a member or an assembly with a length which is sufficiently great to permit a smooth cross-over of a circular inlet for the coating composition into the pearlike shape of the manifold illustrated in FIG. 1.

The following example illustrates the described embodiment of the present invention without, however, limiting it thereto.

Figure 3:
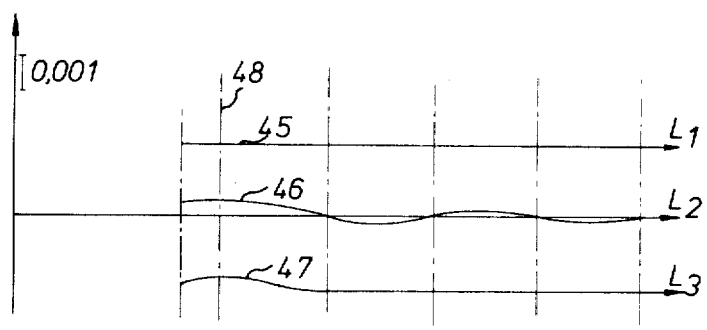
FIG. 3 is a diagrammatic illustration of the effect of the adjustment of one lip in a known die assembly as compared with the effect in a die assembly according to the invention.

Length of the extrusion opening (i.e. about the width of the extruded layer) :1200 mm nominal width of the opening : 0.3 mm distance between the centers of the adjusting members : 50 mm length of a wedge-like adjusting member measured according to the length of the extrusion opening : 35 mm wedge angle : 4°30' biasing force of each pull-bolt 32 : 300 kp biasing force of each adjustment stud 26 : 100 kp pitch of the threaded engagement of a skirt 28 with a stud 26 : 1 mm approximate ratio between the distance a and the thickness of the weakened region : 1 to 5 adjustment range of a lip : 0.1 mm corresponding adjustment stretch of an adjusting member : 1.3 mm A tentative illustration of the deformation of a lip according to its length as a consequence of an adjustment at one given point is diagrammatically represented in FIG. 3, wherein the abscissae represents a portion of the length of a lip edge, such as a lip edge 44 indicated in FIG. 1, the ordinate represents a displacement of the lip edge in the vertical direction, and the vertical dash-and-dot lines represent the centre of several adjusting zones along the length of the lip. Line 45 represents a linear lip edge profile at the right hand side of a given adjustment screw on line 48 whereas line 46 represents the edge profile of a lip which is adjusted by means of a conventional adjustment mechanism on the line 48. It may be seen that a deformation of the lip edge in the form of a wave-like pattern is created which causes lip deformations in a sense which is even opposite to the desired sense. For purposes of illustration the deformation of the edge profile of the lip has been exaggerated, and it will be understood that actually the said deformation will be smaller. Further, the deformation may extend over a greater or smaller distance than shown, and it may be displaced parallel with the abscissae as a consequence of stresses occurring in the die material, play in the screw-threaded engagements with the adjustments screws, etc.

Line 47 illustrates the much more damped deformation of the edge profile of a lip which is obtained with the die assembly in accordance with the present invention. The improvement is obtained by the extremely good locking of the rather flexible lip 20 to the undeformable body member 10 by means of a plurality of wedge-like adjusting members 23 which are in firm contact with at least 50 % of the length and with the full width of the surface 25 of the lip 20.

A further advantage of the die assembly in accordance with the invention is that the opposed inner side surfaces of the lips 20 and 21 which determine the die orifice remain parallel with each other within narrow limits, which is distinct from known die assemblies wherein, as a consequence of the bending of an adjustable lip about a region of reduced cross-section the angle between the opposed surfaces of two lips will vary, and the innerside surfaces of both lips may even locally diverge from each other towards the outlet at a given setting of the adjustment mechanism, a condition which may be extremely detrimental to the quality of an extruded layer.

Finally, the springs 30 and 35 offer an adjustment which is completely free of dead spots, so that a specific position of a nut member 28 corresponds with a specific lip position, whereby a visual indication of the shape of a lip is possible and the lip may easily acquire its initial or previous shape.

Figure 4:
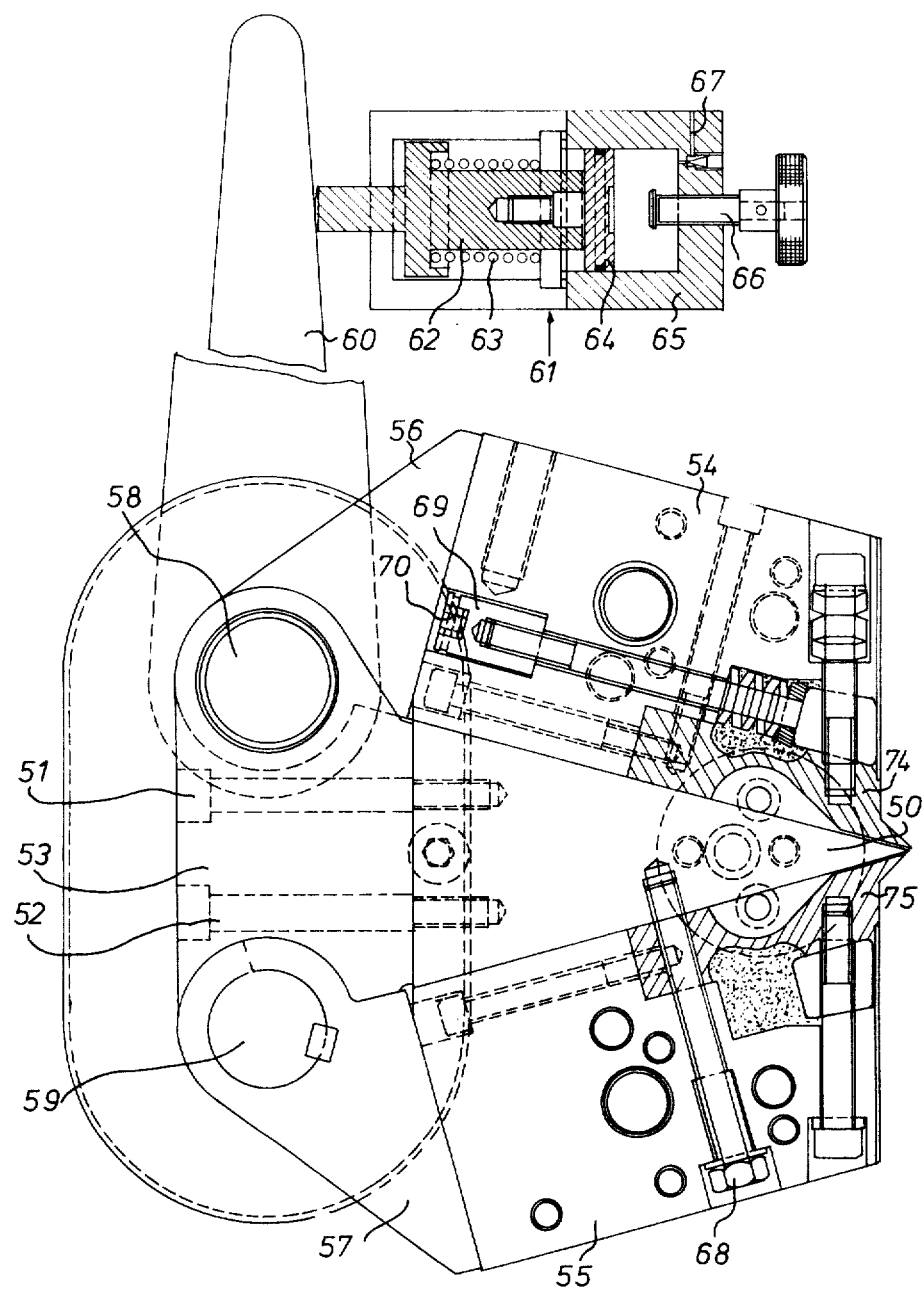
FIG. 4 is a vertical sectional view of a die assembly for the extrusion coating of two layers.

Referring to FIG. 4, the die assembly illustrated is capable of extruding two coating layers which become superposed onto each other immediately after their extrusion. The construction of the adjustable lips and the co-operation of their adjustment mechanism with the die body members are substantially the same as illustrated for the die assembly in FIG. 1. It may be seen, however, that each die orifice comprises only one adjustable lip, and the co-operation of these adjustable lips with a common central and fixed lip member requires some explanation.

The fixed lip member is formed by a solid elongate wedge-like block 50, all surfaces of which have been accurately machined. Said lip member is fixed by two rows of bolts 51 and 52 to a horizontal beam 53 which may support the complete die assembly. Die body members 54 and 55 with lips 74 and 75 are connected to triangular supports 56 and 57 which are fitted to shafts 58 and 59. The shafts are rotatably supported in the beam 53. To the shaft 58 of the upper die body member 54 are fitted arms, such as the arm 60 illustrated, which may abut against a damper assembly such as 61 which comprises a displaceable plunger 62 which is biased by a spring 63 and connected to a piston 64 which acts as a damper in a cylinder 65 which is provided with an adjustable opening 67. An adjustment screw 66 controls the extreme position of the damper mechanism at the right hand side. For maintenance and cleaning of the described die assembly the bolts which tightly connect a body member to the common lip member, such as the bolts 68 which are illustrated for the lower die member 55, are removed so that said body member may be swung away from the central lip member whereby the manifold and the inner lip surfaces become accessible. The closing of the lower die body member requires no particular precautions since said member must be swung upwardly against gravity. The upper body member, on the contrary, must be carefully lowered and the described damper mechanism prevents an uncontrolled abutment of the body member on the central die member. The final fixation of the position of a body member occurs by means of a row of bolts such as the bolts 68 shown. These bolts in fact ensure the angular position of a body member whereas the position of a body member in the direction of extrusion is ensured by the linking of the body member to the pivotable shafts 58 and 59, this as distinct from the positioning by means of a bar such as the bar 16 shown in FIG. 1. After closing of the die assembly, readjustment of the adjustable lips may occur by means of the rotatable nut members 69 which, in the present embodiment, are provided with a socket-type head 70 for engagement by an appropriate tool.

The present invention is not limited to the described embodiments.

It will be understood that the lip members need not necessarily be separate elements but that they may also form integral portions of the die body member, whereby fixation bolts such as the bolts 18 and 17 become superfluous. However, in such case the advantages of rapid replacement of a damaged lip, of the possibility of using for the construction of the lip member a material which has properties which differ from these of the material used for the construction of the body member, and of the greater freedom in the design and the machining of the weakened region of the lip member, are lost.

The displacemet of the adjusting members may occur along an axis that does not run parallel with the place of symmetry of the die assembly. More in particular, the axis 26 shown in FIG. 1 may run parallel with the upper, rather than with the lower surface of the adjusting members.

The construction comprising the disc springs 30, and the studs 27 with the threaded nut members 28 may be replaced by a differential screw mechanism for adjusting the position of the adjusting members 23.

The construction comprising the bolts 32 and the disc springs 35 may be replaced by bolts, the heads of which rest directly on a shoulder in the die body member, and which bolts must be unlocked each time an adjustment of the corresponding adjusting member must be done.

The supporting of the die assembly shown in FIG. 4 and the opening of said assembly may differ from the description hereinbefore. For instance, the die body member 55 may be fixedly mounted on a horizontal supporting beam. Said supporting beam may have a very great stiffness in the vertical direction, and in that way the body members 54 and 55 may be of lighter construction, especially in case the length of the die orifice is greater than, say 1.20 m. In such case the central fixed lip 50 may be arranged for rotation about a bodily stationary shaft 59 and the upper body member 54 may be arranged for rotation about a shaft 58 which is journalled in an extension at the rearside of said central lip. Appropriate gear couplings may be provided between the members 54, 50 and 55 so that upon opening the upper body member 54, the central lip member 50 pivots simultaneously away from the body member 55, but at a rate which is half that of the die body member 54.

The lips of the die assembly may have widened portions at their lateral extremities thereby to form a layer of a liquid composition with beaded edges, as for instance in the case of the extrusion of a thermoplastic orientable polymer film which is oriented after extrusion by lateral and longitudinal stretching to improve its physical properties by molecular orientation. The lateral stretching of such film occurs by clamps that grip the film edges and follow diverging paths, and it has been proved that film edges which are beaded may be firmer held by such clamps than non-beaded edges.

Finally, the manifold of the die may have other shapes than these shown in FIGS. 1 and 4, and the inner lip faces may converge towards each other over a smaller or greater part of their length towards the die orifice, rather than running parallel as illustrated in the figures.

We claim:

1. A die assembly comprising a die body section, a pair of elongated lip members mounted in said body section which have opposed lips defining an elongated slot-like orifice through which material can be extruded as a layer, said lips being constituted by spaced apart generally parallel surfaces having an extended depth dimension in the extrusion direction, at least one such lip member having a base portion affixed in said die body section, an end portion carrying said lip-forming surface, and an interconnecting neck portion of reduced cross-section which is sufficiently flexible to allow displacement of such end portion thereby to vary the spacing between said lip surfaces, said lip member end portion having an outer guide face extending along a side thereof opposite said lip-forming surface with a depth not substantially less than the depth of said lip-forming surface, said die body section having a fixed face extending thereon in spaced generally opposed relation to said guide face, said guide and fixed faces being inclined relative to one another in their depth dimension, a plurality of wedge-like adjusting members arranged in the clearance space between said relatively inclined guide and fixed faces at points spaced lengthwise thereof, each such member having opposite surfaces in mating contact with said faces, means for individually adjusting the position of said wedge-like members relative to the depth of said clearance space, and biasing means for biasing said guide face and fixed face relatively toward one another and into contact with the mating faces of said adjusting members.

2. A die assembly according to claim 1, wherein said biasing means is operatively associated with said inclined faces for keeping the portions of the mutually inclined faces of said body section and of said lip in firm contact with the adjusting members comprise a plurality of pull-bolts which are spaced lengthwise of the die assembly and which are screwed into the lip member end portion for exerting a pulling force on such lip end portion.

3. A die assembly according to claim 2, wherein said pull-bolts pass through bores in the body section of the die assembly, and wherein the biasing force is established by compression springs which are provided between the heads of the bolts and corresponding shoulder of the bores.

4. A die assembly according to claim 3, wherein said pull-bolts pass through bores in the adjusting members, said bores permitting a displacement of said members over the required adjustment range.

5. A die assembly according to claim 1, wherein said adjusting members are equally spaced and wherein the distance over which they are in contact with the contacting face of the lip equals at least 50 % of the length of the said lip face.

6. A die assembly according to claim 1, wherein the relative angle between said guide and fixed faces is not greater than 5°.

7. A die assembly according to claim 1, wherein said means operatively associated with said adjusting members for individually adjusting the position of said adjusting members comprises pull-screws for pulling the adjusting members in one direction, and compression springs for pushing the adjusting members in the opposite direction.

8. A die assembly according to claim 7, wherein said pull-screws are in the form of threaded studs which are fixedly attached to said adjusting members and the control of the axial position of said studs occurs through nut members which threadedly engage the free ends of the studs and which bear against a shoulder formed in the body section.

9. A die assembly according to claim 8, wherein said lip member is replaceably fitted to the body section.

10. A die assembly according to claim 3, wherein said compression springs are disc-type springs.

11. A die assembly according to claim 1, wherein at least one lip member is mounted for pivotal movement sufficiently away from the opposite lip member, thereby to facilitate cleaning of the die assembly.

12. A die assembly according to claim 11, comprising one stationary lip member and two movable lip members which are pivotally mounted on opposite sides of the stationary lip member for co-operation therewith.

* * * * *